United States Patent [19]

Gregory et al.

[11] 4,263,551

[45] Apr. 21, 1981

[54] METHOD AND APPARATUS FOR IDENTIFYING CONDUCTIVE OBJECTS BY MONITORING THE TRUE RESISTIVE COMPONENT OF IMPEDANCE CHANGE IN A COIL SYSTEM CAUSED BY THE OBJECT

[75] Inventors: William D. Gregory, Vienna; Larry H. Capots, McLean; both of Va.

[73] Assignee: Georgetown University, Washington, D.C.

[21] Appl. No.: 871,099

[22] Filed: Jan. 20, 1978

Related U.S. Application Data

[63] Continuation-in-part of Ser. No. 622,892, Oct. 16, 1975, abandoned.

[51] Int. Cl.³ .............................................. G01R 33/12
[52] U.S. Cl. ..................................................... 324/233
[58] Field of Search ................. 324/227, 228, 232, 233

[56] References Cited

U.S. PATENT DOCUMENTS 3,619,771  11/1971  Hentschel .......................... 324/233
3,686,564  8/1972   Mallick, Jr. et al. ................ 324/232
3,758,849  9/1973   Susman et al. ...................... 324/225
3,763,424  10/1973  Bennett, Jr. et al. ................ 324/226

OTHER PUBLICATIONS

New Proximity Device Detects Metallurgical Differences; Automation; Sep. 1968, p. 11.

Primary Examiner—Rudolph V. Rolinec
Assistant Examiner—Walter E. Snow
Attorney, Agent, or Firm—John J. Byrne

[57] ABSTRACT

The type of conductor, its property, and if a metal, its type and cross-sectional area can be obtained from measurements made at different frequencies for the amount of unbalance created in a previously balanced stable coil detection system. The true resistive component is accurately measured and thus reflects only the voltage loss attributable to eddy currents caused by introduction of the test sample to the coil system. This voltage divided by corresponding applied frequency gives a curve which peaks at a frequency dependent upon type of conductor. For a metal this peak frequency is proportional to the samples resistivity divided by its cross-sectional area.

28 Claims, 14 Drawing Figures

Peak Frequency Reciprocal

METHOD AND APPARATUS FOR IDENTIFYING CONDUCTIVE OBJECTS BY MONITORING THE TRUE RESISTIVE COMPONENT OF IMPEDANCE CHANGE IN A COIL SYSTEM CAUSED BY THE OBJECT

This application is a continuation-in-part of application Ser. No. 622,892, filed Oct. 16, 1975, now abandoned.

BACKGROUND OF INVENTION

Metal detection systems have been used for more than thirty years, and have been capable of determining the presence or absence of a metallic object. Such systems have found many applications in various fields, and more recently, such systems have been finding widespread use as weapons detector devices. However, these systems when used for weapons detection have not been able to readily distinguish between various types of metallic objects.

These systems use an induction coil to which an oscillating signal is applied. Detection readings heretofore have been limited to a general determination as to the presence of a metal object with no precision in the identification process.

It has now been discovered that information can be developed which will permit this type of detection system to make specific identification of objects having conductive properties, and to give repeatable data for a specific object.

Previous systems have limited application because of their inability to distinguish between different types of objects, and in the use of these systems for detection at airports, there has been a persistent false alarm problem. With the development of the system of this invention, it is now possible to accurately obtain information with respect to the type of conductive object disposed in the coil field, including information as to the various metallic components that are contained in it if there is more than one metal. This makes it possible to readily screen for different types of metallic objects of interest to preclude false alarms.

In addition, the system of this invention represents a break-through in that accurate repetitive readings can be obtained which make it possible to apply such systems to other areas, such as metal classification, sampling, testing of conductive solutions, animal tissues, and for tagging techniques.

SUMMARY OF INVENTION

This invention relates to metal detection systems for objects having conductive properties, and particularly to a more advanced and sophisticated type of detection system than previously possible.

This system makes it possible to accurately check for a specific object and can be used as a means of sorting different kinds of metal, even making it possible to distinguish between different types of hand guns.

Essentially, this new detection system is based upon the discovery that in a previously balanced coil system, after introduction of a conductive or of a metal sample, the true resistive component of the impedance change occurring in the coil system due to eddy current loss can be determined. When divided by frequency applied ($\Delta R/f$), it gives a value which varies with frequency and peaks at a single peak frequency. This peaks frequency value is proportional to the cross-sectional area of the object in a plane transverse to the coil. In addition, the peak frequency, or that occurring at a maximum $\Delta R/f$ value, has been found to be proportional to the resistivity of the sample divided by its cross-sectional area.

However, these results will not occur unless very accurate measurements are made and all extraneous effects caused by the various system components, such as the frequency generator, coil and detection circuits, are taken into consideration. This is, in order to obtain a true picture of the effect of the sample, it is necessary to look only at the true resistive component change in the coil system.

The true resistive component change can only be obtained if the output signal is referenced to within one degree of the phase of the signal applied to the input coil. Unless this phase relationship, which is hereafter referred to as zero degree phase shift, is kept, the results obtained will not provide the accuracy required for most contemplated uses of the system.

DESCRIPTION OF THE INVENTION

Figure 1:
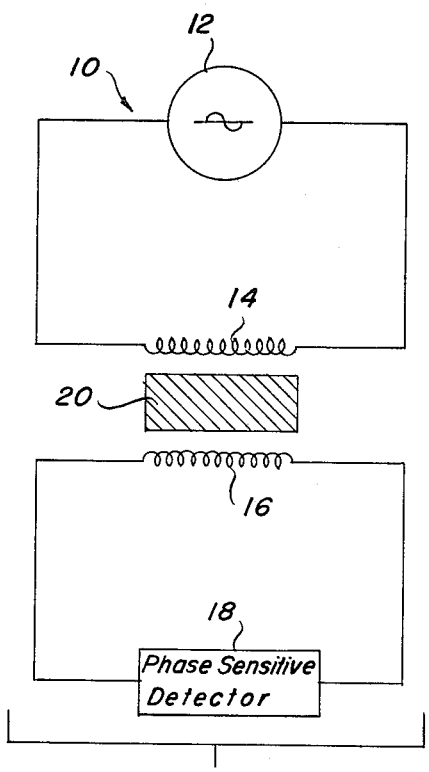
FIG. 1 shows a mutual inductance detector circuit.

Referring particularly to FIG. 1, an detector system 10 is shown in which the alternating current signal source 12 supplies a signal to the input or primary coil 14. The secondary coil 16 is connected to a phase sensitive detector 18, which will pick up variations in the secondary coil signal when a metal object 20 is disposed within the field, schematically shown between the input or primary coil 14 and the secondary coil 16. Coil diameter can be any size from a small sample coil of 12" to a 6' walk-in coil. The object can be placed either within the coil for maximum response or outside but close to the coil as long as it is within the generated magnetic field.

It has been found that tests involving metals can be made at frequency ranges from 100 to 10,000 hertz. However, if the frequency is increased to the 1-10 megahertz range, test results can be obtained for samples having conductive properties such as metal powder-type explosives, animal tissue, acqueous solutions, ionic solutions and suspensions.

Figure 2:
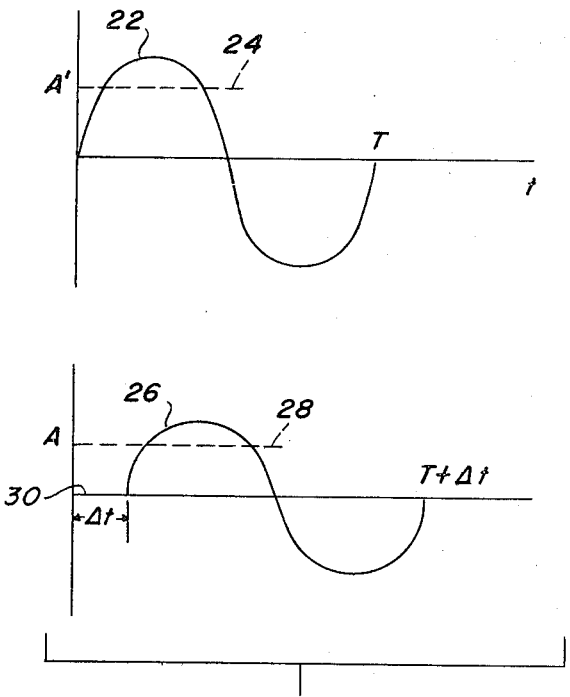
FIG. 2 is a graph of the secondary coil signal illustrating the shift caused when a metal object is placed between the coils of FIG. 1.

FIG. 2 shows in the top diagram the sinusoidal wave 22 which is present in the secondary coil 16 prior to introduction of the metal object 20 between the input and secondary coils 14 and 16 of FIG. 1. The amplitude A' of this wave has an rms value shown by the dotted line 24. The signal curve 22 passes through the origin and represents the undisturbed balanced condition for the system where the input and secondary coil signals are in phase and the system is balanced.

When the metal object 20 is introduced into the field there is a phase displacement of the signal in the secondary and a voltage loss occurs increasing the voltage value measured by the phase sensitive detector 18. This change situation is shown by the curve 26 on the lower graph. The rms value A shown by the dotted line 28 decreases due to eddy current effects, and the wave form itself is displaced in time along the axis as shown at 30 by interval Δt.

Figure 3:
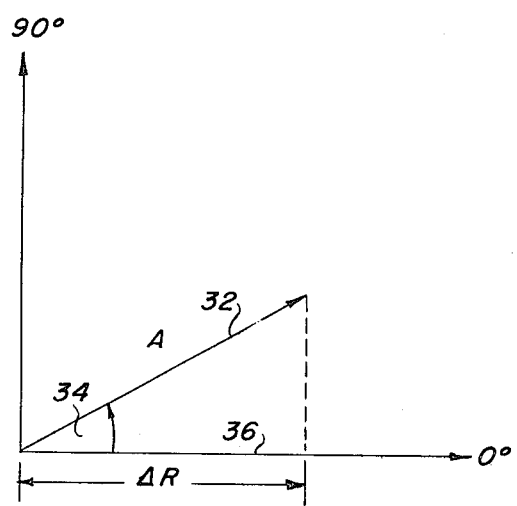
FIG. 3 is a vector diagram of the voltage amplitude vector which shows the resistive component.
Figure 4:
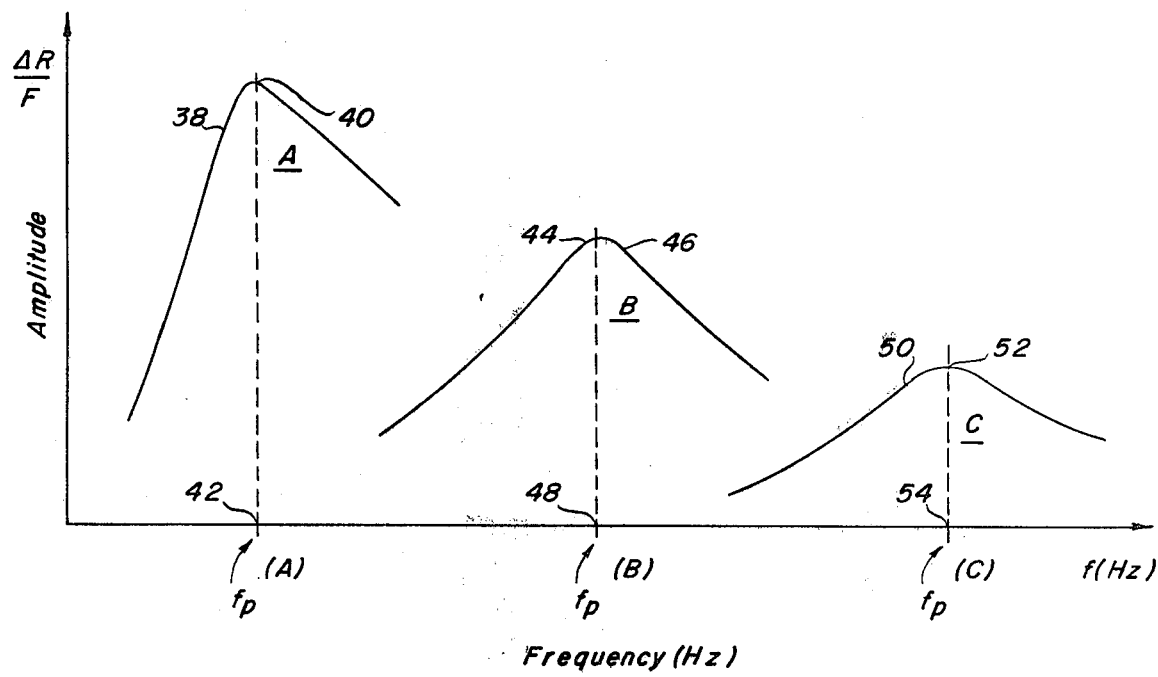
FIG. 4 is a graph of resistive component divided by frequency versus frequency for a metal object.

The vector diagram in FIG. 3 shows the situation when a metal object such as 20 is introduced to the field between the input or primary coil and secondary coils 14 and 16. The vector A is shown at 32. This vector makes an angle 34 with the zero degree phase line and represents the amount of displacement shown in FIG. 2 on the lower graph at 30. A reading of interest for purposes of this invention is the resistive component ΔR shown at 36 which runs along the zero degree phase line. This value is the reading that is picked up by the phase sensitive detector 18. It is one of the essential values used in connection with the principles of this invention. It makes it possible to find peak eddy current loss by plotting the resistive component divided by corresponding frequency against that frequency. This is shown in FIG. 4 for a metal sample of three different cross-sectional areas. The larger sample A is represented by the curve 38 which has a peak as shown at 40. This plot will give what is termed the peak frequency, as shown by the dashed line 42. From this plot the value of peak frequency and matching resistive component divided by frequency is found.

The sample B, which is of smaller cross section than that of sample A, but of the same material, gives a peak curve 44 with a peak 46 which is less in amplitude than that of the larger sample A. The peak frequency line 48 shows that the peak frequency for the smaller sample is higher than that of the larger sample.

Similarly, sample C is made of the same metal as samples A and B and is of smaller cross-sectional area than sample B. The peak frequency curve 50 for sample C is somewhat flatter and has a peak value 52 of considerably smaller amplitude than either of the other samples. The peak frequency line 54 shows that it also has a considerably higher peak frequency value.

Figure 5:
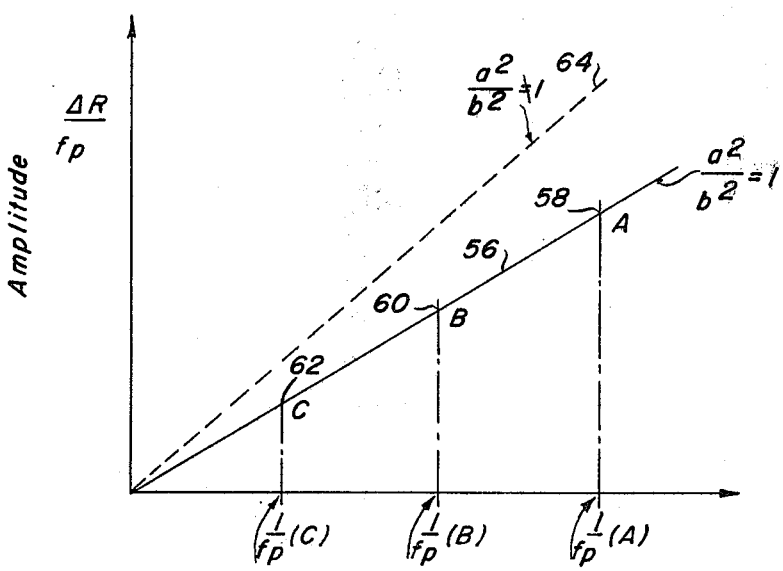
FIG. 5 is a plot of resistive component peak values divided by peak frequency versus the reciprocal of the peak frequency, showing the linear relationship in peak values when cross section area and cross-section geometry of a metal object vary.

It will be noted that the peaks for all three samples shown in FIG. 4 are in alignment, and a plot using the reciprocal of the frequency, as shown in FIG. 5, based upon peak frequency values for these three samples gives a straight line 58. The ordinate for amplitude, in this graph is the resistive component divided by the peak frequency, while abscissa is the reciprocal of the peak frequency values.

A plot of peak frequency values for samples A, B and C is shown at 58, 60 and 62, respectively. The dashed line 64 represents a geometrical factor. It has been found that the slope of this line will vary slightly with changes in cross-sectional configuration. In this graph, line 58 shows readings taken with a test object of square cross section. The dashed line 64 indicates the change in slope that will be expected where there is a considerable change in geometry.

It should be noted that these peak frequency values will vary considerably depending upon the type of metal used, inasmuch as metal resistivity is a major factor. This can be clearly seen in a review of the graphs shown in FIG. 6.

Figure 6:
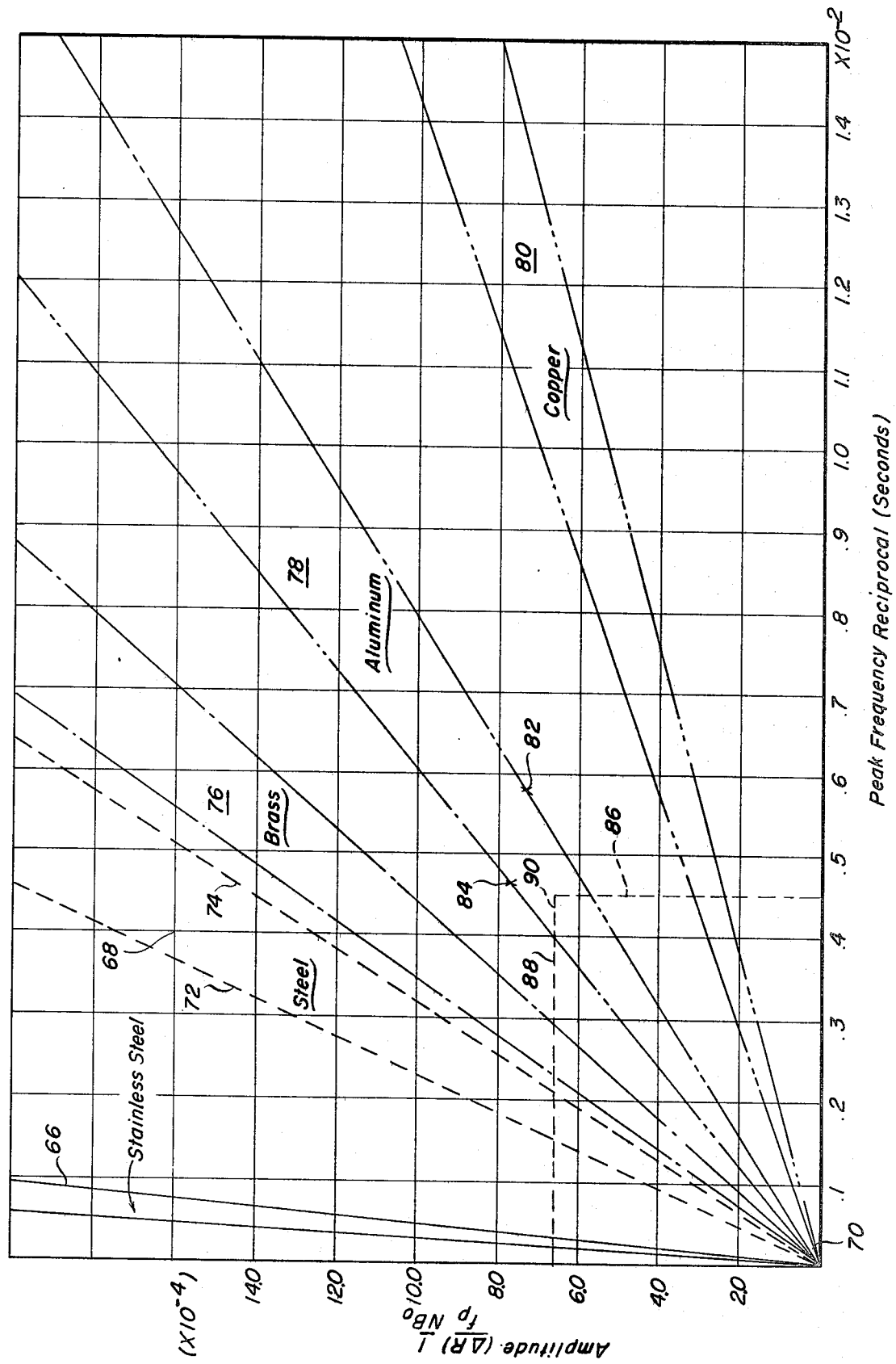
FIG. 6 is a plot similar to FIG. 5 showing linear relationships for various types of metal objects.

FIG. 6 is a detailed graph of the same type as shown in FIG. 5 and shows the response characteristics for different metal samples. It should be noted that in this graph, coil configuration is taken into consideration for the values given, in that the peak amplitude value includes the resistive component divided by the peak frequency, as well as the reciprocal of the number of turns in the input coil and the reciprocal of the magnetic induction expressed in Webers per square meter $$\left( \frac{\Delta R}{f} \cdot \frac{1}{NB} \right).$$

The abscissa for this graph is the reciprocal of the peak frequency expressed in hundredths of a second.

The bands shown on the graph for the different types of metal have a wide range of slope values. The primary factor in determining the slope of the bands is the resistivity of the metal involved. Band 66, which represents the linear range of peak values for stainless steel, has a very high resistivity, as compared to the more conductive metals, such as copper and aluminum. The band 68 shows the range of peak frequency values for steel. This band, as well as all of the other bands shown on the graph, fan out from the origin 70. The wide difference in slopes of each of the bands is attributable to the correspondingly wide range of resistivity values for the metals shown. The following table for metals and their corresponding resistivity illustrates this:

| Metals | Resistivity (Micro-ohm - Centimeters) |
| --- | --- |
| Copper | 1.7 |
| Aluminum | 4.0 |
| Brass | 7.0 |
| Steel | 10.0 |
| Stainless Steel | 72.0 |

The slightly diverging lines determining the width of each band, such as lines 72 and 74, reflect small changes in slope that are due to geometrical cross section variances of the sample. Peak frequency for brass, aluminum and copper are shown respectively by the bands 76, 78 and 80.

With respect to variation in cross-sectional geometry, the sample under test may be defined as having a geometric ratio, G, which is equal to the width squared divided by the heighth squared i.e., $G=a^2/b^2$. This factor is taken into consideration on plots for the bands shown for each metal, where the lower line represents a square block (G=1) test specimen, while the upper line represents a rectangular block with a width twice that of the height (G'=4).

For example, referring to the aluminum band 78, of FIG. 6, the lower line contains the point 82 at which a one inch square aluminum sample (G=1) could be found. The reciprocal peak frequency value is approximately 0.58 hundredths of a second, and the resistive component amplitude, $$\frac{\Delta R}{f_p} \cdot \frac{1}{NB_o},$$

has a value of slightly less than 7.5.

Correspondingly, point 84 lies on the line defining the upper limit (G=4) for the aluminum band 78. This would be the point giving a reading for an aluminum object of one square inch cross-sectional area which has a width twice its height. It will be noted that point 84 has a slightly higher amplitude value and a slightly lower time value for the reciprocal of the frequency. Experimental data for the same cross-sectional dimension blocks for the other metals gave values for all of these metals in which the amplitude for the one inch square test specimen is about the same as those of points 82 and 84—specifically, around a value of approximately 7.5. For example, a square copper test sample with an area of one square inch would have an amplitude of 7.5 and a reciprocal peak frequency value of 1.4 hundredths of a second.

Although, it is seen that variations in cross-sectional geometry have a slight effect on slope, changes in cross-sectional area will not affect the slope but will vary greatly affect both amplitude and reciprocal frequency values. They will, however, be proportional and fall along the G=1 line for each band where the test specimen is square. For example, for a square test specimen of one-half inch square cross-sectional area, the peak frequency point will be midway between the origin 70 and point 84. For a square aluminum test object having a cross-sectional area of two square inches, the peak frequency values will lie along the G=1 line at a point twice the distance from the origin 72 point 82.

To use the graph of FIG. 6 to determine resistivity and cross-sectional area of an unknown object, values for amplitude and the peak frequency reciprocal are obtained from a graph line FIG. 4. Where the reciprocal of a peak frequency has a value of 0.45 hundredths of a second, the vertical reference line 86 is established. Where the amplitude valuation $$\left(\frac{\Delta R}{f_p} \cdot \frac{1}{NB_o}\right)$$

is $6.5 \times 10^{-4}$, the horizontal reference line 88 is established. The intersection of both of these lines at 90 indicates that the unknown object in the coil system is made of aluminum and has a cross-sectional area of slightly less than one square inch.

As can be seen from the manner in which the respective bands are separated from each other, it is possible to readily distinguish one type of metal from the other with the resistive component and peak frequency reciprocal values even if considerable difference in cross-sectional shape exists.

Figure 7:
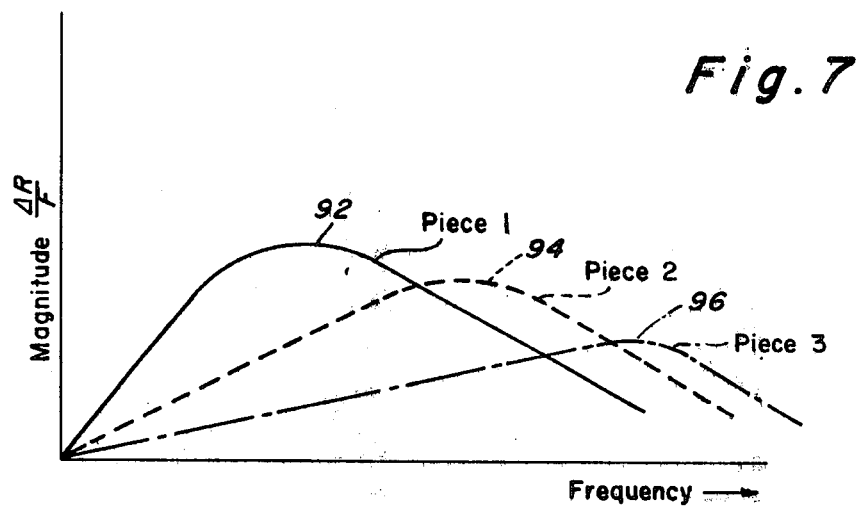
FIG. 7 is a plot similar to FIG. 4, showing peak curve signal where plural pieces are disposed in the coil.

The preceding discussion has assumed a single metal object. In most detection situations, there are several different objects that have several different metallic components which it is desirable to detect. In these cases, each of the different metals will product its own peak signal. For example, in FIG. 7, three pieces are sensed by the detector system. Piece 1 generates curve 92, piece 2 generates curve 94, and piece 3 generates curve 96. The resultant envelope includes a single trace with three humps representing the peak frequency and amplitude value for such piece or metal component. It is assumed that each of these pieces could be of a different metal and of a different cross section. The detection system using the change in resistive component is sufficiently sensitive to distinguish the peaks for each of the different metal pieces as the different frequency values are applied.

Figure 8:
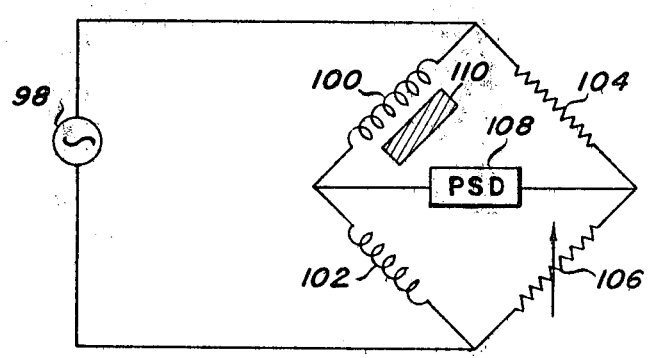
FIG. 8 shows a second type of detector circuit using a balanced bridge arrangement.

FIG. 8 shows a balanced bridge detection system which can be used. This balanced bridge arrangement is preferred over the the detection system of FIG. 1, in that it is more readily balanced and does not have serious perturbations on measurements. The signal frequency generator 98 is disposed across the bridge as shown at one end of the sensing coil 100, and at the corresponding end of matching coil 102. Both coils have similar values. Resistance 104 forms the other leg of the bridge, and variable resistance 106 which generally matches the value of resistance 104 forms the other leg of the bridge. The phase sensitive detector 108 is connected between the common junctions of the coils 100 and 102 at one side and the common junction of resistors 104 and 106 on the other side. The reading of the phase sensitive detector will assist in adjustment of the variable resistor 106 to get a balanced condition across the bridge prior to introduction of the test object 110. When the test object 110 is introduced to the field surrounding coil 100, an eddy current loss will unbalance the bridge and the phase sensitive detector will read the resistive component value which must be referenced to the coil 100 signal.

Figure 9:
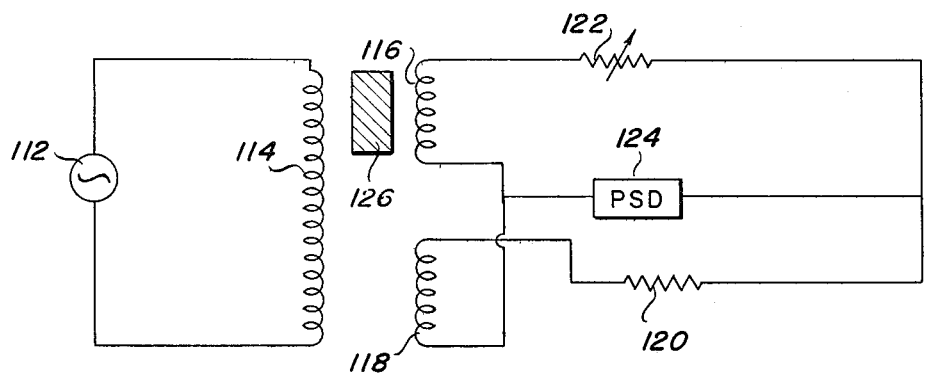
FIG. 9 shows another type of detector circuit which uses a split coil balanced secondary.

FIG. 9 shows another type of phase sensitive detection circuit arrangement which has proven to be very satisfactory. The signal frequency generator 112 is connected across the input coil 114. Secondary coils 116 and 118, which are of equal value, are connected at their lower ends. Fixed resistor 120 is connected to the upper end of coil 118 at one end and has its other end directly connected to a variable balancing resistor 122 which is connected to the upper end of coil 116. A phase sensitive detector 124 is connected across the common connections of coils 116 and 118 at one end and the common connection between resistors 120 and 122 at its other end. The metallic object 126 is disposed between the input coil 114 and the split secondary coil assembly made up of coils 116 and 118. This detector system provides maximum sensitivity and ease of balance with the variable resistance 122.

Figure 10:
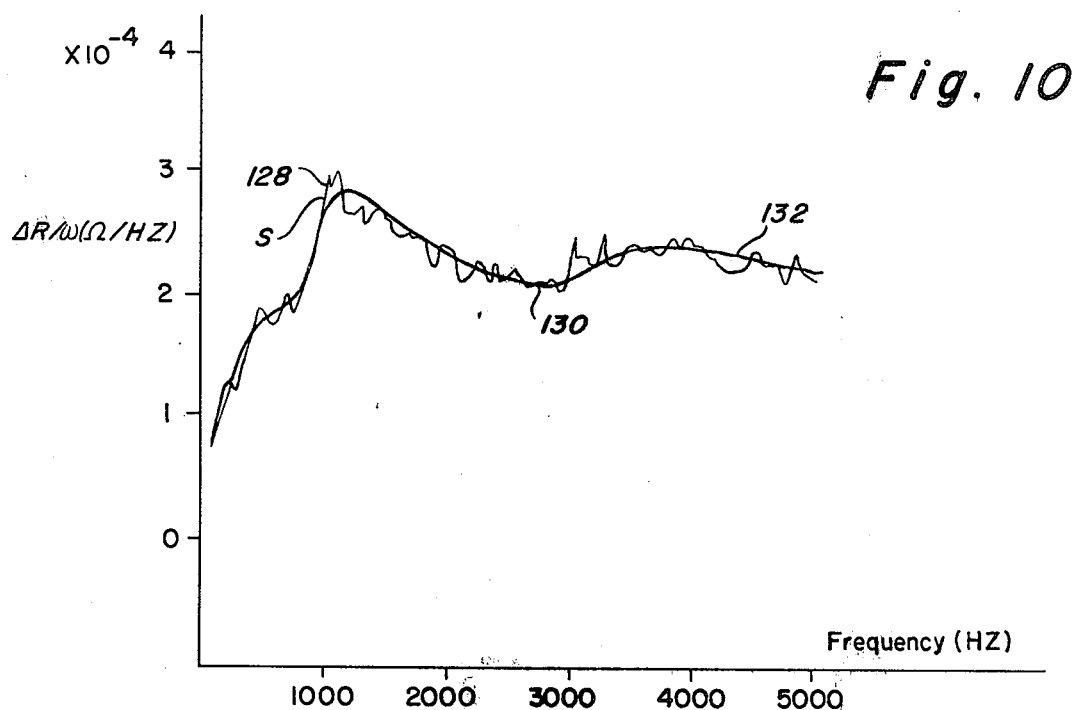
FIG. 10 is a plot of resistive component divided by frequency versus frequency which gives the signature for a Smith and Wesson stainless steel revolver.
Figure 11:
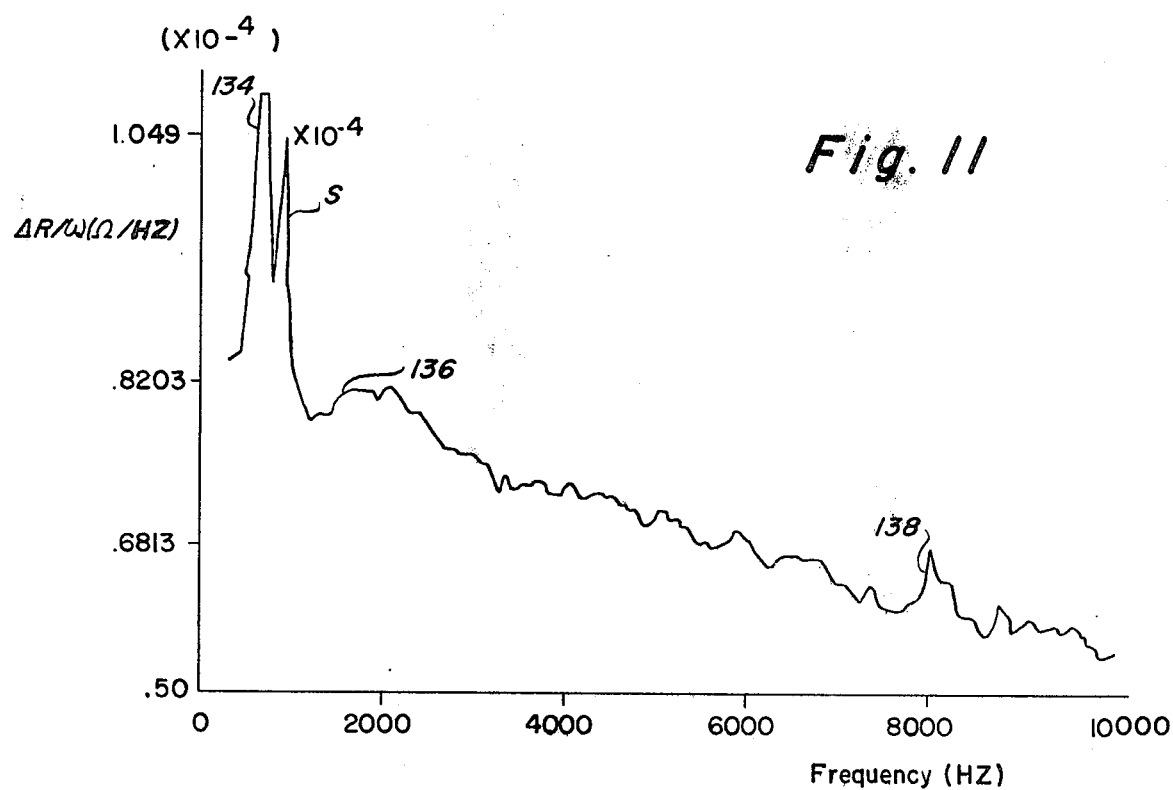
FIG. 11 is a plot of resistive component divided by frequency versus frequency showing the signature for a Titan 0.25 revolver.

The actual signature trace that is developed by a complex object, such as a gun, is shown in FIGS. 10 and 11. FIG. 10 shows the signature S for a Smith and Wesson 0.38 caliber stainless steel revolver. The ordinate is the resistive component divided by the frequency and the abscissa is the applied frequency values. The trace has a high peak at 128, which indicates the barrel of the revolver, and the low portion 130. In order to obtain such a signature, it is necessary to apply some thirty different frequencies over the 10,000 hertz range. For automatic analytical purposes, such as used with curve analysis, an average curve envelope is obtained as shown by the curve 132. This would then be analyzed and compared to a series of stored signatures in the device.

FIG. 11 shows the signature S for a Titan 0.25 revolver. This signature has a high pronounced spike at 134, and peaks at 136 and 138. Both of these signatures are very dissimilar in apperance. They have peaks at differennt frequencies and the signatures are at different amplitude levels. Digital and other comparative techniques make it possible to readily distinguish between each of these two signatures. The signatures for other weapons and other types of objects are just as distinctive as these two examples.

In airport detection systems, where the individual passing through the coil area may carry numerous types of metal articles, it is also possible to readily pick out the existence of a gun signature. The various articles add to the overall signal envelope, but the gun signature is still readily distinguishable. In almost every instance, the signal produced by the gun will be the predominant signal.

Figure 12:
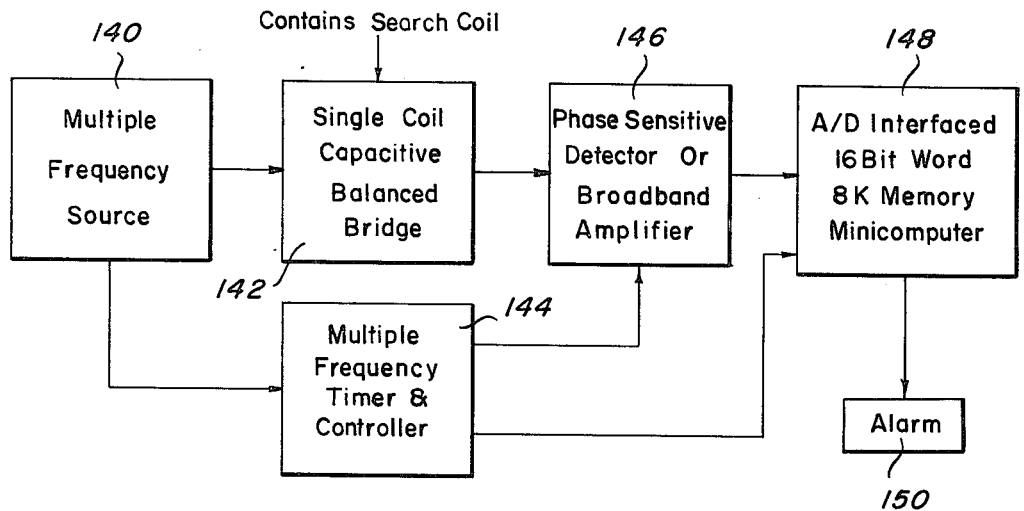
FIG. 12 is a block diagram of the detector system where a minicomputer is used for comparison of received signature with those of known objects.

FIG. 12 gives a block diagram arrangement of the hardware components of the weapons detector system. The multiple frequency source 140, which is the equivalent of the frequency signal generators of FIGS. 1, 8, and 9, supplies a signal to the balanced circuit, indicated here at 142. It is also possible to use a balanced system including a bridge with a single coil. The arrangement is similar to that shown in FIG. 8, except that a resistive element is used in place of coil 102 of FIG. 8, and the variable resistance 106 of FIG. 8 now contains a variable capacitor in parallel with it.

In FIG. 12, the multiple frequency source also transmits a frequency to the multiple frequency timer and controller 144. The frequency range will be from 100 to 10,000 hertz and can be spanned with approximately thirty different frequencies within this range. This is the frequency range shown in FIG. 11, and is more than adequate for all of the situations for which the system is designed.

The multiple phase sensitive detector section 146 will receive the signals from the bridge, as well as from the timer and controller circuit 144. The phase sensitive detector output, as well as the output from the multiple frequency timer and controller section 144, are supplied to the minicomputer 148. Typically, this is an 8K memory 16 Bit word minicomputer.

With respect to the computer, an analog to digital converter is used to interface the phase sensitive detector circuitry to the computer. The empty coil response of the induction coil electronics, and its response to a known resistance change are stored in the computer memory. With regard to FIG. 13, blocks 152 and 154 are used to calibrate the coil electronics and produce true zero degree phase component data.

The computer will have comparison capability with stored data signature values to which the incoming digital signal input is compared. If there is a match for any of the stored signals representing a weapon or other item for which a check is to be made, the computer sends the signal to an alarm circuit 150.

Instead of using the analog phase sensitive detector techniques to separate the zero degree component at each frequency, it is possible to achieve the same results with the use of digital Fourier transform techniques to mathematically make the correction for phase shift in values obtained by the system. This would involve replacing the individual analog phase sensitive detector units for each frequency and using a good broad band amplifier at 146 instead of the phase sensitive detector units. This, together with an accurate time base generator for use as a clock, would make it possible to use the Fourier technique. The data would be studied at fixed time intervals and analyzed in the minicomputer by standard Fourier transform techniques.

Figure 13:
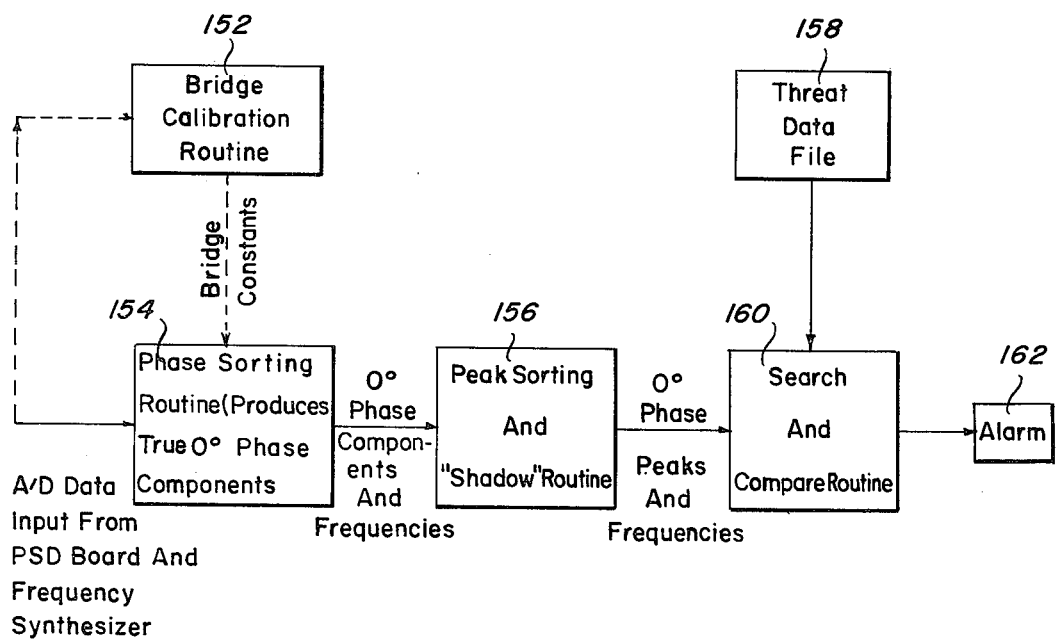
FIG. 13 is a block diagram of the software elements of the detector system of FIG. 12.

FIG. 13 gives the basic logic steps and functions of the system of FIG. 12 using the phase detector. Initially, there is the bridge calibration routine illustrated in block 152, followed by the phase sorting routine indicated in block 154.

The zero degree phase values then are sorted as indicated in block 156, producing zero degree phase resistive component values and peak frequency values.

The threat data file 158 is fed into the search and compare block 160 for comparison with the input signals which will be supplied from the peak sorting block 156. A comparison is made in block 160 and if there is a match of threat and incoming active data a signal is sent to the alarm block 162.

Figure 14:
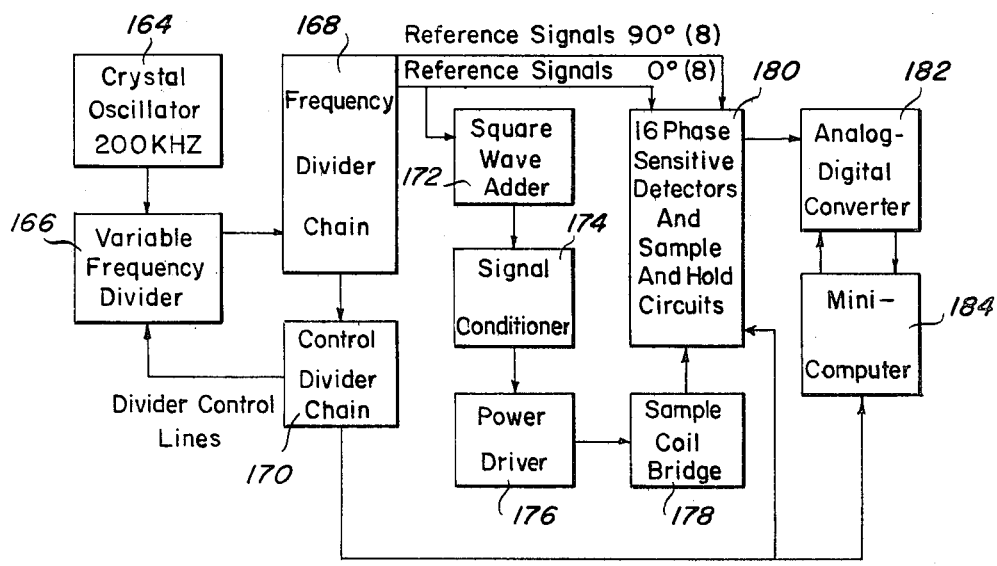
FIG. 14 is a block diagram of a detector system showing phase sensitive detection where analog switch circuits and digital logic integrated circuits are used.

FIG. 14 is a more detailed block diagram for a proposed detector system. A crystal oscillator 164 is used to generate a standard frequency which is supplied to a variable frequency divider network 166. The output is supplied to a frequency divider chain 168 which supplied three outputs. The first goes to the control divider chain block 170. The second output goes to the square wave adder section 172 and subsequently to the signal condition block 174 and power driver 176. The output from the power driver is supplied to the sample coil bridge 170, and its output supplied to the phase sensitive detector section 180.

With respect to the phase sensitive detector circuitry, containing a set of sixteen individual analog phase sensitive detectors, one for each frequency of interest, as described with reference to FIG. 12, it is possible to use standard analog switch devices which can readily be used with the sample and hold circuitry necessary for computer interfacing.

The frequency dividers are J-K flip flops which provide zero degree phase and 90° reference square waves at eight octave frequencies simultaneously. Three starting frequencies provided consecutively by the variable divider, permit sampling a total of 24 frequencies between about 70 Hz and 12.5 Kilohertz.

The square waves drive the reference channels of the phase sensitive detectors directly, and the in-phase components are analog added to form a composite square wave containing eight frequencies. This wave form is integrated in a conditioner to form a composite triangle wave. The high frequencies are preamplified in the adder to make the triangle amplitude the same for all frequencies. Power operational amplifiers apply this signal to the bridge, and the off-balance signal is amplified and phase detected.

When a fixed number of cycles have occurred, the phase detector output is sampled and held until the computer has accepted it. The starting frequency is changed, and the process repeats. When all the frequencies have been sampled, the control divider stops the process.

OPERATION

As to operational aspects of the system, it has been found that the phase relationships are critical in measuring the true resistive component. Inasmuch as measurements of voltage unbalance are made in the 10 to 100 microvolt range and involves a factor of 1 in 10,000, all equipment must be very stable and accurate to preclude introduction of phase shifts which would make it impossible to maintain the zero degree phase relation required for measurement of true resistive component impedance change in the sensing coil.

The coil itself must be extremely stable, and it has been found that this stability must be held to at least one part in ten thousand, with a preferred stability of one part in one hundred thousand. Spacing between adjacent turns of the coil, temperature stability of the wire or shielded from temperature variation, and preclusion of displacement of the turns due to vibration are factors of importance. The turns in the coil are preferably spaced from one to two centimeters apart to reduce interturn capacitive effects. The coil should be as free as possible from all extraneous effects.

The oscillator circuit itself must be extremely stable to preclude phase wiggle or shift due to temperature, vibration, or instability of its elements. Signal output variation should be held to less than one tenth of a degree when using Fourier techniques and one-half degree when using phase sensitive detectors. Oscillator elements must have low thermal change characteristics, and be within about one tenth of one percent of their value while operating to preclude unacceptable variation jitter in output signal. Similar rigid requirements are necessary for the bridge and measuring elements.

The phase angle in the input coil is of importance, and all voltage data must be referenced to it. Corrections for phase shift of the various circuit elements must be made when measurements are made either upstream or downstream from the input coil.

The several system coils should be as identical as possible and they should be shielded from temperature variation. All of these restrictions are necessary to give consistent repetitive results where frequently the volume of the sample is on the order of a cubic centimeter while the coil volume is a cubic meter.

It has been found that this requirements can be met by previously determining what this angle is with respect to other equipment, such as the oscillator, and making a correction for it. The simplest manner of determining the phase angle in the input coil is to place a resistor in series with the input coil and measure the phase angle of the signal passing through it. This will allow determination of the resistive portion of the coil system output signal caused by the unbalance of a metal object only. Using the known resistance, in series with the coil makes it possible to obtain corrective data. In this case, data is obtained on both the plain coil response and the coil and resistor response and is useful in a correction equation which takes into account both the real and imaginary values of the voltage. This information can readily be programmed into the computer and incoming data can normally be modified to make the correction for zero degree phase shift.

Adjustments for zero degree phase can then be made either in the instrumentation, such as in the phase detector circuitry, or calibration data can be obtained and incoming data modifed accordingly, such as with a computer system using a Fourier technique to obtain the true resistive component.

The above-described calibration technique which involves introduction of a known pure resistance in series with the sensing coil provides knowledge as to the portion of the sensing coil input signal unbalance caused by introduction of a metallic object.

The method used to determine what portion of the unbalanced output signal corresponds to this resistive change will, of course, depend upon the specific balancing circuitry employed.

In the case of the measurement circuit using a bridge arrangement, although it is more easily balanced, it has many extra circuit components between the sensing coil and the output signal. There must be compensation for the extra circuit elements to determine the phase shifts introduced by them, and they must be compensated for, either electrically, or by computation subsequent to measurement.

Once the various phase shifts in the system are known, it is a matter of applying the appropriate correction in phase shift so that the resistive component values obtained be referenced to zero degree phase existing in the input coil. As mentioned above, the correction should be made to bring the resistive component vector to within one degree of the resistive component of the coil system impedance.

The adjustments for zero degree phase can be made in the instrumentation, or calibration data applied to the measurement to make the necessary correction for zero degree phase shift.

It has been found that referencing to the oscillator output signal is a most convenient method of obtaining a good fixed phase base. Correction for shift between the oscillator and the sensing coil must be made to obtain the zero degree phase line, and once this is obtained, appropriate referencing can be made to the phase of the output signal obtained from the circuit and correction made so that they are within one degree of being completely in phase with each other. It should be kept in mind that the correction equations taken into account both the real and imaginary values of the voltage. This information can readily be programmed into a computer and the incoming data can normally be modified to make the correction for zero degree phase shift.

It has been found that the value obtained when there is zero phase shift will be within plus or minus five percent. Any greater displacement than the plus or minus one degree tolerance will result in a substantial loss of accuracy such that the data will not be repetitive for similar samples. The straightline relationships as shown in FIG. 6, for example, will not be usable.

In a complex object it is unnecessary to use specific peak frequency values, since many peaks, one for each of the various metal components of the object to be checked, will appear. The selection of thirty frequencies in the range of from 100 to 10,000 hertz will give a typical range and will produce the results shown for the signatures of interest for guns and also permit easy identification of other types of objects. To develop the signatures as shown in FIGS. 10 and 11, frequency values are chosen for relevancy to both the resistivity of the metal being sought, as well as the estimated cross-sectional area.

With reference to the two FIGS. 10 and 11 showing the signature traces, there will be a very great correlation between the test sample and the actual sample encountered. As to different types of objects with slight variances in design and makeup, as in different types of guns, the signatures will vary significantly because of the differences in cross-sectional area and resistivity of the various components of which the article is made.

For identification, the computer can store the various signatures for the known objects to be checked for by the detection system, correct the incoming signal for zero degree phase correlation with the input coil system signal, and then compare the incoming signal data from the unknown object disposed in the sending coil with the stored signatures to determine whether there is a match.

The object is physically placed within the sensing coil itself. Frequency reciprocal values change greatly with changes in cross-sectional area. This should not be confused with the changes in cross-sectional geometry which have some effect, but not the appreciable effect which results from resistivity and cross-sectional area changes in the sample, i.e. $f_p = K\rho/A$. To develop the signatures as shown in FIGS. 10 and 11, frequency values are chosen for relevancy to both the resistivity of the metal being sought, as well as the estimated cross-sectional area.

Coil configuration and geometry are important to note since the signature traces will be affected by them. In this respect, the terms N and $B_o$ will be noted in FIG. 6. This gives some guidance with respect to coil design which is a factor in response characteristics of the system.

The expression showing the variables associated with the ordinate in FIG. 6 is as follows:

$$\Delta R/f_p = [(N\,B_o)(32/2)(\rho/\mu_o)K(a^2/b^2)]1/f_p$$

N = number of turns of wire on the coil
$B_o$ = magnetic induction (Webers/square meter)
$\rho$ = resistivity of the metal under test (ohm-meters)
$\mu_o$ = permeability of free space ($4\pi \times 10^{-7}$ — MKS units)
$K(a^2/b^2)$ = dimensionless quantity which depends on geometry through the ratio $a^2/b^2$.
$\Delta R$ = in phase component of the detected signal, i.e. see FIG. 2 (volts)
$f_p$ = peak frequency (Hz)
$[(N\,B_o)(32/\pi 2)(\rho/\mu_o)K(a^2/b^2)]$ — slope of the straight lines in FIG. 4. (Note that there is no dependence on the sample cross section.)

With respect to the constant terms in the equation, when $a^2/b^2$ equals respectively 1, 2, 3, and 4, $K(a^2/b^2)$ is 1.248, 1.334, 1.475, and 1.607.

With respect to the coils themselves, their diameter may be from six inches to six feet. The input and sensing coils are usually arranged concentrically in spaced relation with insulation material such as fiber glass disposed between the coils. The coils are shielded from room temperature change by insulation since variation affects output. A further compensating arrangement that has been found effective also is the use of special alloy thermal stable metals rather than copper in the conductors to reduce thermal effects. The six foot coil assembly is used in connection with security at airports in which the individual walks through the coil itself and is scanned for possession of weapons.

Throughout this description, the relation between resistivity, area, peak frequency, and resistive component divided by frequency are given as unique values at curve peaks. However, relationships to resistivity and cross-sectional area may be complex. Nevertheless, all that is needed is a repetitive signature. End effects, shadow effects, and geometric effects and magnetic effects present no problem because signatures for the same object will be exactly the same.

While this invention has been described, it will be understood that it is capable of further modification, and this application is intended to cover any variations, uses and/or adaptations of the invention following in general, the principle of the invention and including such departures from the present disclosure as come within known or customary practice in the art to which the invention pertains, and as may be applied to the essential features hereinbefore set forth, as fall within the scope of the invention or the limits of the appended claims.

What we claim is:
1. A system for identifying objects having conductive properties, comprising:
    (a) a highly stable coil system for producing a magnetic field into which the object is introduced, and having an input coil and being relatively free of extraneous effects,
    (b) frequency generating means having extremely little variation from rated values, connected to the input coil for applying plural selected periodic driving frequencies thereto, and
    (c) means for obtaining the true resistive component of the impedance change in said coil system due to the conductive object placed in the magnetic field of the coil system at each driving frequency by referencing the output signal of said coil system to within one degree of the signal applied to the input coil for all frequencies.
2. The system for identifying objects as set forth in claim 1, wherein:
    (a) the means for obtaining the true resistive component obtains a voltage reading to within one degree of being completely in phase with the frequency signal applied to the input coil.
3. The system for identifying objects as set forth in claim 1, wherein:
    (a) the coil system values are accurate to at least one part in ten thousand of its rated values.
4. The system for identifying objects as set forth in claim 1, wherein:
    (a) the coil system includes two coils, one of which is the input coil, and both coils are very accurately matched.
5. The system for identifying objects as set forth in claim 1, wherein:
    (a) the coils of the coil system have very little variation in value due to change in ambient temperature.
6. The system for identifying objects as set forth in claim 1, wherein:
    (a) the frequency generator output has less variation than one-half of one degree.
7. The system for indentifying objects as set forth in claim 1, wherein:
    (a) the means for obtaining the true resistive component includes phase sensitive detection means which is connected across the coil system and is accurately referenced to be almost exactly in phase with each periodic signal applied to the input frequency coil.
8. The system for identifying objects as set forth in claim 1, including:
    (a) means for dividing the true resistive component obtained for a selected frequency applied to the input coil by that frequency.
9. The system for identifying objects as set forth in claim 8, including:
    (a) storage means for storing resistive component divided by corresponding frequency values, and
    (b) comparison means for comparing subsequently generated resistive component divided by corre- sponding frequency values obtained for a second object disposed within the magnetic field of the coil system.

10. The system for identifying objects as set forth in claim 1, wherein:
    (a) the coil system includes a secondary coil, and
    (b) both the input and secondary coils are hollow coils, the turns of which are spaced from but adjacent to each other, the coils having a common central axis.

11. The system for identifying objects as set forth in claim 1, wherein:
    (a) the coil system includes a matching coil identical to the input coil connected in series therewith in a balanced bridge circuit.

12. The system for identifying objects as set forth in claim 11, wherein:
    (a) the two matched coils are connected across two output leads of the frequency generating means
    (b) two impedances in series are also connected across the frequency generating means leads
    (c) one of the impedances is variable for balancing the circuit, and
    (d) phase sensitive detection means is connected across the bridge between the two coils at one point, and between the two impedances at a second point.

13. The system for identifying objects as set forth in claim 1, wherein:
    (a) the input coil is a hollow coil connected across the output leads of the frequency generating means
    (b) the coil system includes a secondary coil arrangement of two identical matched hollow coils connected in bucking relationship and axially arranged with respect to each other and adjacent the input coil
    (c) balancing variable resistive means is connected in circuit with the secondary coils, and
    (d) phase sensitive detection means is connected in circuit between the two matched coils of the secondary for measuring the true resistive component.

14. The system for identifying objects as set forth in claim 1, including:
    (a) the means for obtaining the true resistive component value includes means for providing a correction for zero degree phase shift from the phase of the signal applied to the coil system.

15. The system for identifying objects as set forth in claim 1, wherein:
    (a) the frequency generating means provides signal frequencies over a range of from one hundred to ten thousand hertz, approximately for identification of metallic objects.

16. The system for identifying objects as set forth in claim 1, wherein:
    (a) the frequency generating means provides signal frequencies over a range of from one to ten megahertz, approximately for non-metallic conductive objects.

17. The system for identifying objects as set forth in claim 1, wherein:
    (a) the coil system is a balanced bridge,
    (b) the means for obtaining the true resistive component includes computer means, for comparing the true resistive component values for successive frequencies with known values, is connected to the means for obtaining the true resistive component to identify the object.

18. The method of identifying objects having conductive properties, comprising the steps of:
    (a) generating a plurality of signal frequencies, the variation of which are less than one-half a degree
    (b) applying the signal frequencies to the input coil of a balanced highly stable coil system
    (c) introducing an object having conductive properties into the field of the coil system
    (d) obtaining the true resistive component of the eddy current loss which is within one degree of being in complete phase with the frequency signal introduced to the input coil
    (e) dividing the resistive component by the frequency applied to the input coil, and
    (f) using these values as a function of frequency to determine a set of signature data for the object.

19. The method of identifying objects having conductive properties as set forth in claim 18, including the step of:
    (a) balancing the coil system to provide maximum sensitivity for detection of the true resistive component caused by eddy current loss.

20. The method of identifying objects having conductive properties as set forth in claim 19, including the step of:
    (a) storing a plurality of sets of signature data for comparison purposes, and
    (b) comparing the sets of signature data with data obtained from an unknown object.

21. The method of identifying objects having conductive properties as set forth in claim 19, including the step of:
    (a) introducing a specific uniform type of metal sample of given cross-sectional area to the field of the coil system to obtain reference data values.

22. The method of determining response characteristics for objects having conductive properties, comprising the steps of:
    (a) applying a plurality of periodic signal frequencies to a stable coil assembly of a metal identification system
    (b) balancing the coil assembly after such frequencies are applied
    (c) introducing a metal sample of known cross section and uniform composition to the field of the coil system
    (d) obtaining the true resistive component of impedance unbalance caused by the metal object, and compensating for phase shift with respect to the phase of the input frequency, such that the resistive component value is obtained at zero degree phase shift
    (e) dividing such resistive component values by corresponding frequencies, and
    (f) plotting such values as a function of frequency to obtain a peak at a frequency at which resistivity of the metal sample divided by its cross-sectional area is proportional to the true resistive component impedance divided by corresponding frequency.

23. The method of determining the response characteristics for objects having conductive properties, comprising the steps of:
    (a) applying a plurality of periodic signal frequencies to a stable coil assembly of a metal identification system
    (b) balancing the coil assembly in both phase and amplitude (c) introducing a plurality of the same kind of metal samples of different cross-sectional area to the field of the coil system (d) measuring the true resistive component of impedance unbalance caused by each of the metallic objects which is within one degree of being completely in phase with the frequency signal applied to the coil system, and (e) compensating for phase shift in the system with respect to the phase of the signal frequency introduced to the coil system, such that the resistive component is obtained at zero degree phase shift.

24. A system for identifying objects having conductive properties, comprising:

(a) a highly stable coil system for producing a magnetic field into which the object is introduced, (b) the coil system including two coils, one of which is an input coil, (c) both of said two coils being accurately matched and having values that are within one part in ten thousand of their rated values, (d) frequency generating means connected to the input coil for applying plural selected periodic driving frequencies thereto, (e) the frequency generating means having an output variation which is less than one-half of one degree from its rated value, (f) means for obtaining the true resistive component of the impedance change in said coil system due to the conductive object placed in the magnetic field of the coil system at each driving frequency by referencing the output signal of said coil system to within one degree of the signal applied to the output coil for all frequencies.

25. A system for identifying objects having conductive properties as set forth in claim 24, wherein:

(a) the means for obtaining the true resistive component includes phase sensitive detection means which is connected across the coil system and is accurately referenced to be almost exactly in phase with each periodic signal applied to the input frequency coil.

26. The system for identifying objects having conductive properties as set forth in claim 24, wherein:

(a) the coils of the coil system are connected in series in a balanced bridge circuit, and (b) two other impedances are connected across the frequency generating means as the other part of the bridge, one of such impedances being variable for balancing the circuit.

27. The system for identifying objects having conductive properties, as set forth in claim 1, wherein:

(a) the input coil is a hollow coil connected across the output leads of the frequency generating means, (b) the coil system includes a secondary coil arrangement of two identical matched hollow coils connected in bucking relationship and axially arranged with respect to each other and adjacent the input coil, (c) balancing variable resistive means is connected in circuit with the secondary coils, and (d) the means for obtaining the true resistive component includes computer means for calculating the correction to be made for phase shifts introduced in each driving frequency.

28. A system for identifying objects having conductive properties, comprising:

(a) a highly stable coil system for producing a magnetic field into which the object is introduced, and having an input coil and being relatively free of extraneous effects, (b) frequency generating means having extremely little variation from rated values, connected to the input coil for applying plural selected period driving frequencies thereto, and (c) electrical means for obtaining an electrical response of the coil system due to introduction of a conductive object placed in the magnetic field of the coil system for each driving frequency, which is a function of the change in true resistive component divided by frequency.

* * * * *

UNITED STATES PATENT AND TRADEMARK OFFICE
CERTIFICATE OF CORRECTION

PATENT NO. : 4,263,551          Page 1 of 2
DATED : April 21, 1981
INVENTOR(S) : William D. Gregory et al.

It is certified that error appears in the above—identified patent and that said Letters Patent is hereby corrected as shown below:

| | |
|---|---|
| Col.1 line 61 | After "that" insert a comma |
| Col.2 line 8 | Change "causec" to --caused-- |
| line 39 | Change "in the coil" to --between the coils-- |
| line 60 | Change "an" to --a-- |
| Col 3 lines 32-33 | Change "primary coil and secondary coils 14 and 16" to --primary coil 14 and secondary coil 16-- |
| Col.4 line 6 | Change "is shown at 58, 60 and 62, respectively" to --at 58, 60 and 62, respectively, results in line 56-- |
| line 7 | Change "factor. It" to --factor, i.e. variation of line 56 for geometrical variation of sample. That is, it-- |
| line 10 | Change "58" to --56-- |
| line 66 | After "width" insert --(a)-- |
| line 67 | Change "heighth" to --height(b)-- |
| Col.5 line 34 | Change "vary" to --very-- |
| line 44 | Change "72" to --70 to-- |
| Col.7 line 8 | Change "differennt" to --different-- |
| line 31 | Change "contains" to --has-- |
| line 34 | Before "to" insert --signal-- |
| line 52 | After "change" insert a comma |
| Col.8 line 20 | After "data" insert a comma |
| lines 26-27 | Change "supplied" to --supplies-- |
| line 32 | Change "170" to --178-- |
| line 49 | After "added" add --in square wave adder 172-- |
| line 50 | After "is" add --then-- |

UNITED STATES PATENT AND TRADEMARK OFFICE
CERTIFICATE OF CORRECTION

PATENT NO. : 4,263,551            Page 2 of 2
DATED : April 21, 1981
INVENTOR(S) : William D. Gregory et al.

It is certified that error appears in the above—identified patent and that said Letters Patent is hereby corrected as shown below:

| | |
|---|---|
| Col. 8 line 51 | Before "conditioner" insert --signal--; after "conditioner" add --174-- |
| line 53 | After "adder" add --172-- |
| line 54 | After "Power" insert --driver-- ; change "apply" to --1076 applies-- |
| line 58 | After "held" insert --in converter 182-- |
| line 59 | After "computer" insert --184-- |
| line 61 | After "divider" insert --170-- |
| Col. 9 line 12 | Change "shielded" to --shielding-- |
| Col. 10 line 34 | Change "taken" to --take-- |
| Col. 11 line 68 | After "following" insert a comma |

In the Claims:

| | |
|---|---|
| Claim 7 line 1 | Change "indentifying" to --identifying-- |
| Claim 20 line 2 | Change "19" to --18-- |
| Claim 21 line 2 | Change "19" to --18-- |

Signed and Sealed this

Twenty-fifth Day of May 1982

[SEAL]

Attest:

GERALD J. MOSSINGHOFF

*Attesting Officer*     *Commissioner of Patents and Trademarks*